(12) United States Patent
Eriksson

(10) Patent No.: US 11,590,643 B2
(45) Date of Patent: Feb. 28, 2023

(54) SEALING ARRANGEMENT FOR A TIGHTENING TOOL

(71) Applicant: ATLAS COPCO INDUSTRIAL TECHNIQUE AB, Stockholm (SE)

(72) Inventor: Ulf Mikael Eriksson, Vallentuna (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 129 days.

(21) Appl. No.: 17/254,346

(22) PCT Filed: Jun. 20, 2019

(86) PCT No.: PCT/EP2019/066312
§ 371 (c)(1),
(2) Date: Dec. 21, 2020

(87) PCT Pub. No.: WO2020/002116
PCT Pub. Date: Jan. 2, 2020

(65) Prior Publication Data
US 2021/0268638 A1   Sep. 2, 2021

(30) Foreign Application Priority Data
Jun. 29, 2018  (SE) .................................. 1830207-5

(51) Int. Cl.
*B25F 5/02* (2006.01)
*B25B 21/00* (2006.01)
(Continued)

(52) U.S. Cl.
CPC .............. *B25F 5/02* (2013.01); *B25B 21/007* (2013.01); *F16J 15/3204* (2013.01); *B23P 19/06* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 3,603,603 A * 9/1971 Woodson ............. F16J 15/3236
277/582
6,994,113 B2 * 2/2006 Rousselin ............... F16K 1/305
137/613

(Continued)

FOREIGN PATENT DOCUMENTS

CN       2285395 Y      7/1998
CN     103934786     *  7/2014  ............. B25B 21/00
(Continued)

OTHER PUBLICATIONS

Chinese Office Action dated Nov. 2, 2021, issued in counterpart Chinese Application No. 201980043628.0.
(Continued)

*Primary Examiner* — Nathan Cumar
(74) *Attorney, Agent, or Firm* — Holtz, Holtz & Volek PC

(57) ABSTRACT

A handheld electric tightening tool includes a housing and a sealing arrangement. The sealing arrangement is adapted to seal a first portion of the housing from a second portion of the housing and includes a sealing element and a spring. The sealing element includes a first portion adapted to bear against a shoulder formed in the housing, and a second portion adapted to bear against a portion of an outer surface of a rotating axle of the tool. The spring is adapted to at a first end bear against a shoulder formed in the sealing element and at a second end bear against a supporting element arranged on the axle, such that a force is exerted on the sealing element urging the sealing element against the shoulder formed in the housing.

14 Claims, 3 Drawing Sheets

(51) Int. Cl.
  *F16J 15/3204* (2016.01)
  *B23P 19/06* (2006.01)
(58) Field of Classification Search
  CPC .. F16J 15/3208; F16J 15/3212; F16J 15/3216; F16J 15/322; B25F 5/00; B25F 5/02; B25F 5/006; B25F 5/008; B25B 21/00; B25B 21/007; B23P 19/00; B23P 19/06
  USPC ........................................................ 277/572
  See application file for complete search history.

(56) References Cited

U.S. PATENT DOCUMENTS

| | | | |
|---|---|---|---|
| 8,343,370 B2 * | 1/2013 | Dewald | B29C 66/71 |
| | | | 216/57 |
| 10,105,829 B2 | 10/2018 | Parwani et al. | |
| 2021/0154812 A1 * | 5/2021 | Zander | B25B 23/08 |

FOREIGN PATENT DOCUMENTS

| | | | | |
|---|---|---|---|---|
| CN | 103934786 B | | 5/2016 | |
| CN | 104875004 B | * | 10/2017 | ............ B23P 19/006 |
| CN | 107618000 A | | 1/2018 | |
| DE | 1277768 B | | 9/1968 | |
| EP | 0100364 A1 | | 2/1984 | |
| WO | 2015069166 A1 | | 5/2015 | |

OTHER PUBLICATIONS

International Preliminary Report on Patentability (IPRP) dated Apr. 29, 2020 issued in International Application No. PCT/EP2019/066312.
International Search Report (ISR) dated Oct. 30, 2019 issued in International Application No. PCT/EP2019/066312.
Written Opinion dated Oct. 30, 2019 issued in International Application No. PCT/EP2019/066312.

* cited by examiner

SEALING ARRANGEMENT FOR A TIGHTENING TOOL

TECHNICAL FIELD

The present invention generally relates to electrical power tools for tightening of screws, more particularly to an electrical tightening tool comprising a housing and a sealing arrangement adapted to seal a first portion of the housing from a second portion of the housing.

TECHNICAL BACKGROUND

Electrical power tools for tightening are known to be used in various industries. For example, in the electronics industry tightening tools are used for tightening of small screws. Such tools commonly include a mechanism for facilitating the picking and holding of the, in many cases very small, screws utilized. Examples of such mechanism include various vacuum solutions, where vacuum is provided at a front end of the tool such that the small screws may be sucked into position at a bit or similar.

More particularly, so called vacuum adapters are known where vacuum is provided by means of an auxiliary adapter that attaches to a front end of the tool, where vacuum is commonly provided by means of a separate hose attached to the adapter. One example of such an adapter is shown in document WO2015/069166 by the present applicant. Such devices however, being auxiliary devices as such, add complexity to the system. Further, the hoses needed to provide the necessary vacuum impose additional constraints to the tool and work place and may hence pose an inconvenience to the user.

In order to alleviate some of these problems, tightening tool having internal hoses or channels through which the vacuum may be provided to a front end of the tool have been proposed.

These designs however present various problems associated with the provision of proper sealing between the parts of the tool where vacuum prevails and other parts. Solutions proposed include the use of sealing bearings, where various drawbacks include that the varying pressure (i.e. the vacuum) negatively affects the rubber seals of such bearing thereby decreasing the sealing performance and that the vacuum may cause an undesired removal of grease from the bearings impairing functionality and decreasing the life time of the bearings. Hence, there exists a need for improvements in the field of tightening tools having such internal vacuum arrangements.

SUMMARY OF THE INVENTION

Accordingly, it would be desirable to provide a tightening tool comprising an improved sealing arrangement. In particular, it would be desirable to provide such a tightening tool providing improved sealing properties and preferably an increased life time. To better address one or more of these concerns a tightening tool comprising a sealing arrangement as defined in the independent claim is provided. Preferred embodiments are defined in the dependent claims.

According to a first aspect of the invention a tightening tool comprising a sealing arrangement is provided, wherein the sealing arrangement is adapted to seal a first portion of the housing from a second portion of the housing, and comprises a sealing element and a spring. Wherein the sealing element comprises a first portion adapted to bear against a shoulder formed in the housing, and a second portion adapted to bear against a portion of an outer surface of a rotating axle of the tool, and wherein the spring is adapted to at a first end bear against a shoulder formed in the sealing element and at a second end bear against a supporting element arranged on the axle, such that a force is exerted on the sealing element urging the sealing element against the shoulder formed in the housing.

According to the first aspect, the tightening tool (or power tool, these terms are used interchangeably throughout the present specification) provides an inventive solution to the concerns described above by means of a design incorporating a sealing arrangement adapted to seal a first and second portion of the housing by means of a sealing element bearing on the one hand against the axle and on the other being urged by a spring element against a portion of the housing. More particularly, by means of the inventive combination of a static seal provided against the axle, and a movable seal provided against the housing the sealing performance as well as the life time of the sealing arrangement and hence the performance of the power tool may be significantly improved. The spring is adapted to provide a preferably rather small but sufficient force on the sealing element, such that the elements is slightly pressed against the shoulder formed in the housing thus providing a proper seal, but at the same time low enough to provide low friction forces there between. This is advantageous not only in that a predetermined proper spring force for urging the element against the shoulder may be defined, but also in that uncertainties with regards to the contact between the seal and the housing due to for example tolerance chains of the comprised components but also due to wear of the sealing element during the life time of the tool may be advantageously handled. This since the sealing element may move along the axle, i.e. the spring force may move the sealing element along the axle, in order to compensate for any spread due to tolerance and/or wear. Further, due to the force of the spring, the friction between the sealing element and the housing is not only low but also less varying. This is particularly advantageous for a tool providing a lower tightening torque, for example in the range 1-50 cNm or in the range 1-25 cNm, where the influence of varying internal friction conditions is especially disadvantageous with regards to the accuracy of the torque delivered. At the second end, the sealing element bears against the axel of the tool, providing a proper seal at this end as well. Hereby, in addition to the improved sealing and life time provided, known problems related to for example varying friction and thereto associated problems of accuracy of the torque delivered may be avoided or at least mitigated.

According to one embodiment, the tool may comprise or be connected to a controller operative to control the power tool. In one advantageous embodiment, the power tool is a handheld power tool for tightening of small screws comprising an internal vacuum channel or hose in order to provide a vacuum at (or to) a first end of the tool for facilitating the picking of screws. For such a tool, the provision of an improved sealing, more particularly providing a low, substantially constant friction, provides for example improved accuracy of the delivered torque which is of particular importance due to the low torque levels commonly provided by such a tool. The skilled person however realizes that any other type of power tools is conceivable within the scope of the present invention. The skilled person further realizes that throughout the present specification, by vacuum should be understood a region with a gaseous pressure much less than atmospheric pressure, i.e. not necessarily a perfect vacuum.

The sealing element in any case seals against the shoulder of the housing at the first end and against the surface of the axle at the second end, and may be described as being continuously urged against the shoulder by means of the spring. The sealing element is preferably made from a low friction material, such as for example acetal plastic (POM) or Teflon. Further, the stiffness of the spring should preferably be chosen to be as low as possible in order to avoid unnecessary friction but still provide the desired seal. For example, in some embodiments, the stiffness of the spring lies in the interval 0.25-1 N/mm, preferably in the interval 0.25-0.5 N/mm.

According to one embodiment, the sealing arrangement is adapted to fluidly seal a first portion of the housing from a second portion of the housing, wherein a first pressure prevails in the first portion of the housing and a second pressure prevails in the second portion of the housing. The seal provided may be an air tight seal. According to one embodiment, the sealing arrangement is adapted to provide an air tight seal wherein a first pressure prevailing in the first portion is lower than a second pressure prevailing in the second portion of the housing. The first portion of the housing may in some embodiments be a distal portion, i.e. what may be described as a front portion of the housing arranged in closer proximity to the bit and bit holder of the tool at a front end of the tool. In such an embodiment the lower pressure of the first chamber may aid the spring in urging the sealing element towards the shoulder in the housing. Further, according to one embodiment, a vacuum may prevail in the first portion of the housing. This may for example be the case for the group of power tools mentioned above comprising an internal fluid channel for providing vacuum to a front, or distal, end of the tool. In such a tool, means for connecting the tool to a vacuum source may be provided at a second opposite, i.e. rear end of the tool whereby the vacuum may be transferred in the fluid channel though the second portion of the housing into the first portion. Atmospheric pressure may thus prevail in the second portion of the housing. Further, the motor along with other part of the drive line such as gearing may be arranged in the second portion of the housing. Embodiments are also conceivable where vacuum is provided directly to the first portion of the housing as well. According to one embodiment, the handheld electric power tool is further adapted to be fitted with a vacuum adapter for picking up screws, wherein the first portion of the housing in which vacuum prevails is adapted to be fluidly connected to the vacuum adapter. Hereby, vacuum may be conveniently provided to such an adapter (known as such in the art and will therefore not be described in detail), without the inconvenience of external hoses or similar.

According to one embodiment, the first portion of the element has a first outer diameter and the second portion of the element has a second outer diameter, wherein the first diameter is larger such that the shoulder is formed there between. Further, according to one embodiment, the sealing element comprises an intermediate portion arranged between the first and the second portion, wherein the intermediate portion is a resilient portion such that the second portion of the sealing element is biased against the outer surface of the rotating axle. In other words, the intermediate portion may be described as a spring portion urging or pressing the second portion of the sealing element against the outer surface of the axle thus improving the seal provided. In some embodiments, the intermediate portion has a first diameter adjacent to the first portion and a second cross section diameter adjacent to the second portion, wherein the first diameter is larger. In some embodiments, the intermediate portion may be described as a thin walled portion, at least compared to the thickness at the first portion of the element. The wall thickness may be substantially constant.

According to one embodiment, the sealing element is rotationally symmetric and encircles the axle, such that the second portion of the sealing element is adapted to bear against a circumferential portion of the outer surface of the rotating axle. Further, the first portion of the sealing element may be adapted to bear against a circumferential portion of the shoulder of the housing.

According to one embodiment, the sealing arrangement rotates with the axle. In such an embodiment, the seal against the axle at the second portion of the element may be described as a static seal whereas the seal against the shoulder at the first end may be described as a dynamic seal. The sealing arrangement is however not fixed with respect to the axle in an axial direction, i.e. the direction of action of the spring force. Rather, the sealing element may move slightly when acting on by the spring for example to compensate for wear of the sealing element.

According to one embodiment, the second portion constitutes a single area of contact between the sealing element and the axle. For example, in some embodiment, the sealing element may be designed such that a small gap, or play, prevails between the axle of the tool and the sealing element at the first portion of the sealing element. In other words, at the first end of the sealing element, the sealing element may be designed to only bear against the shoulder of the housing and not the axle. This is advantageous for example in that unintentional locking or jamming of the axle may be avoided, while still providing a proper sealing between the first and second portion of the housing, by means of the sealing contact provided at, or by, the second portion of the sealing element.

According to one embodiment, the first portion of the sealing element is a portion arranged at a first end of the element and the second portion of the sealing element is a portion arranged at a second end of the element. According to one embodiment, the first end of the element is a distal end. By distal end should be understood a front end of the housing, i.e. the end at which the bit and bit holder of the tool are arranged. In some embodiments, the first portion of the sealing element faces the first portion of the housing whereas the second portion of the housing faces the second portion of the housing. In some embodiments, the sealing element is arranged on a same side of the shoulder of the housing as the second portion of the housing (viewed along the longitudinal axis of the tool). In some embodiments, the sealing element may even be described as arranged in the second portion of the housing.

According to one embodiment, the first portion of the sealing element extends in a plane, wherein the axle is normal to the plane. Hereby a proper seal is achieved against a surface of the shoulder of the housing, which may be a surface extending in a substantially parallel plane, by means of the spring force acting in the direction of the axle. Further, in some embodiments, the plane may be parallel to a plane of the supporting element arranged on the axle. The second portion of the sealing element, more particularly the portion in contact with the surface of the axle, may in some embodiments be described as extending in a plane parallel to the axle.

According to one embodiment, the supporting element arranged on the axle is a radially protruding support element. Such a supporting element may be integral with the axle or a separate component attached to the axle. For example, according to one embodiment, the radially protruding element is an external circlip or similar structure. According to one embodiment, the handheld electric power tool comprises a washer arranged between the spring and the radially protruding support element, for example a steal washer. This provides an advantageous flat, sufficiently large surface against which the spring may bear. The skilled person realizes that embodiments are conceivable where the spring instead bear against an impression, or slot, in the axle.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawing, on which.

All figures are schematic, not necessarily to scale and generally only show parts which are necessary in order to elucidate the invention, wherein other parts may be omitted or merely suggested.

DETAILED DESCRIPTION

Figure 1:
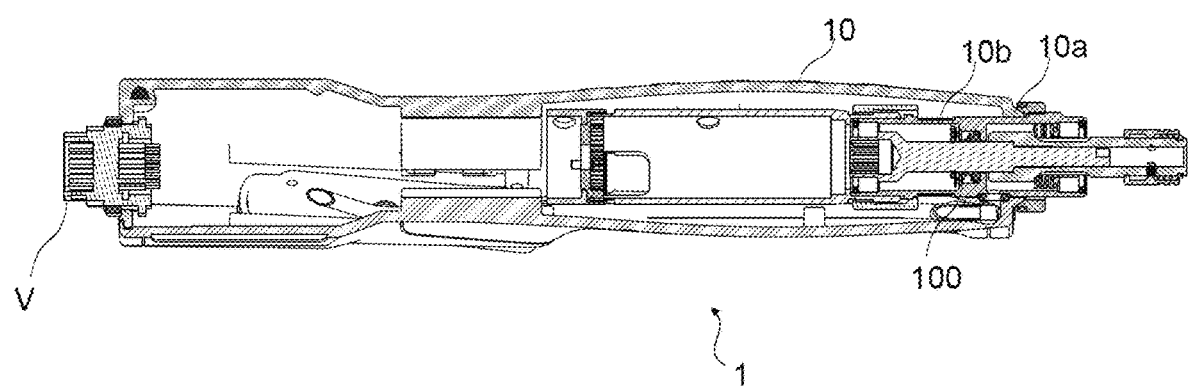
FIG. 1 is a cross sectional view of a tightening tool according to one embodiment.

A power tool 1 comprising a sealing arrangement 100 according to one embodiment is shown in a cross sectional view in FIG. 1. The sealing arrangement 100 is shown in the housing 10, and is adapted to seal a first portion 10a at a front, or distal, end of the tightening tool 1 from a second portion 10b of the tool. In the embodiment of the tightening tool illustrated in FIG. 1 a vacuum, i.e. a relatively lower pressure, prevails in the first portion 10a of the housing and the tool further comprises an internal fluid channel (not shown) for providing this vacuum to the front end of the tool. A vacuum connection V for connecting the tool to a vacuum source is therefore provided at the rear end of the tool. In the second portion 10b, atmospheric pressure prevails.

Figure 2:
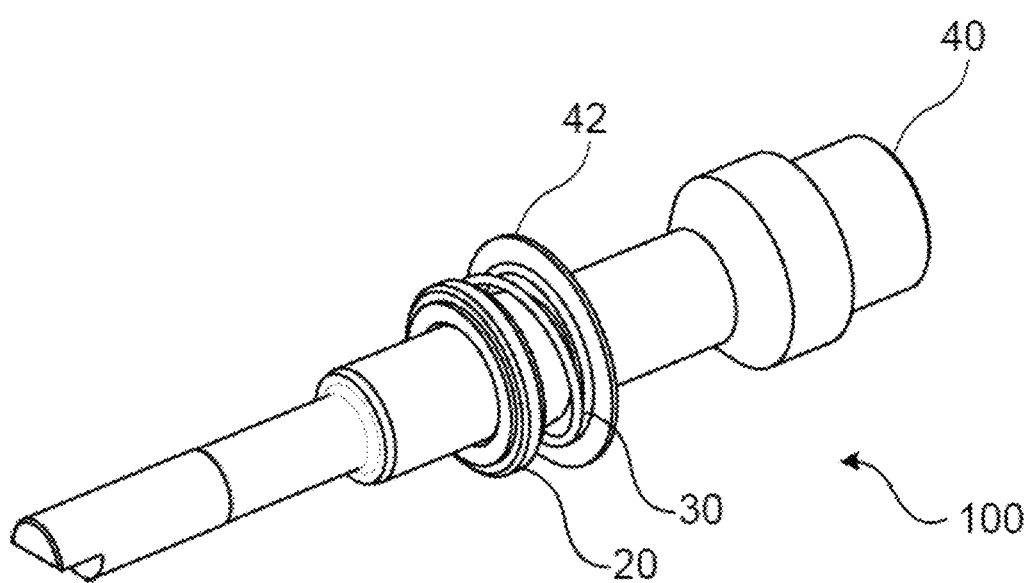
FIG. 2 is a perspective view of an exemplary sealing arrangement of a power tool according to one embodiment.

The sealing arrangement 100 is shown in greater detail, in a perspective view, arranged on a rotational axle 40 of the tool. The sealing arrangement 100 comprises a sealing element 20 and a spring 30. The spring rests against a protruding element 42 arranged on the axle 40 and is adapted to act on the sealing element 20, more particularly urge the element 20 against a shoulder of the housing (not shown in FIG. 2).

Figure 3:
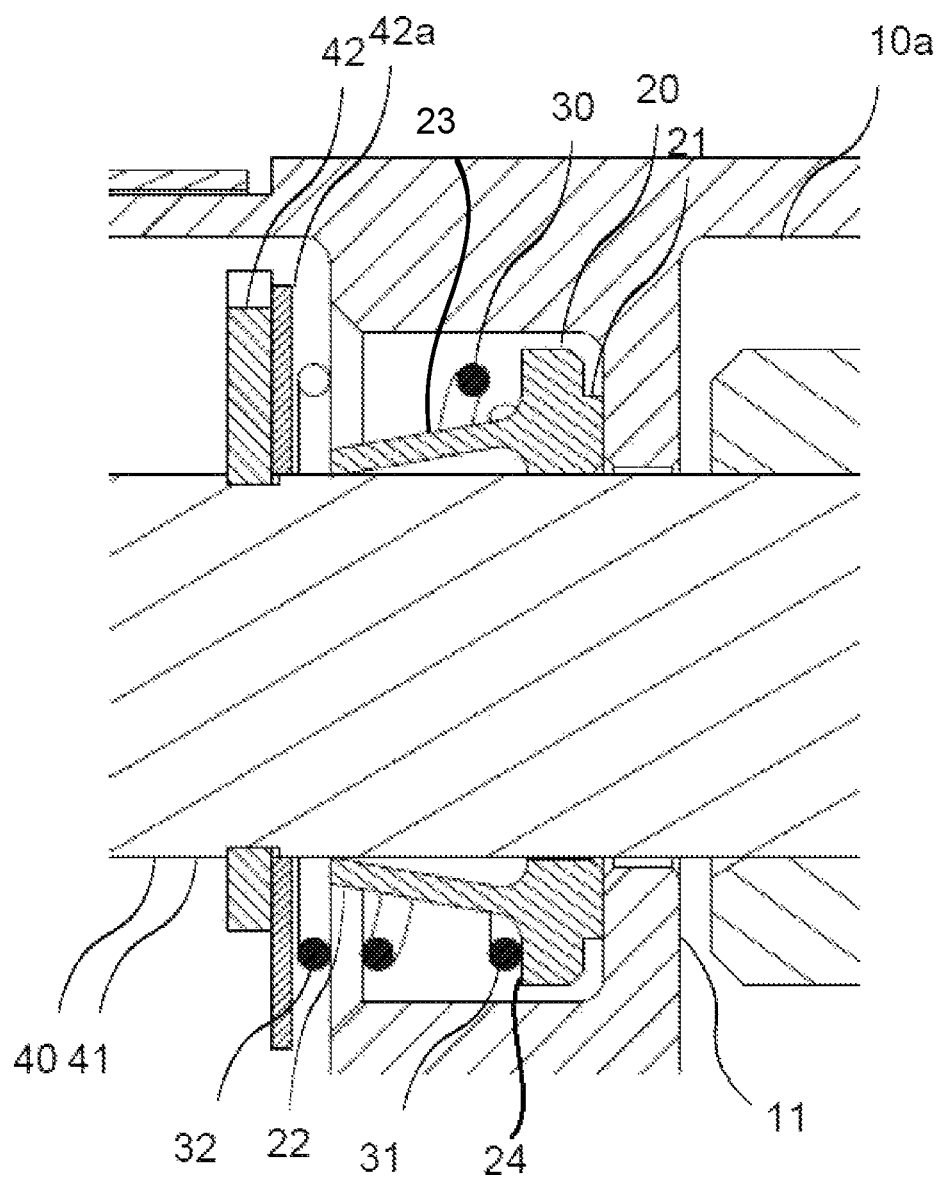
FIG. 3 is a cross sectional view of an exemplary sealing arrangement of a power tool according to one embodiment.

Turning to FIG. 3, the sealing arrangement as well as surrounding parts of the housing 10 of the tool 1 is shown in a cross sectional view, the sealing element 20 providing a seal between the first and second portion 10a, 10b of the housing 10.

The sealing element 20 of the illustrated embodiment is rotationally symmetric and comprises at a first end a first portion 21 which bears against a shoulder 11 formed in the housing 10, and at a second end a second portion 22 bearing against a circumferential portion of the outer surface 41 of the rotating axle 40 of the tool. A resilient intermediate portion 23 is arranged between the first and second portion 21, 22 such that the second portion 22 is forced, or pressed, against the outer surface 41 of the rotating axle 40.

The spring in turn bears at a first end 31 against a shoulder 24 formed between the first and second end 21, 22 of the sealing element 20, and at a second end 32 against a steel washer 42a arranged between the spring and the radially protruding support element 42, in the illustrated embodiment an external circlip 42. Hereby, a force is exerted by the spring 30 on the sealing element 20 urging the sealing element against the shoulder 11. The spring rests, at a second end against a protruding element 42 arranged on the axle 40. A washer 42a is arranged between the spring 30 and the radially protruding support element 42. The washer 42a is substantially parallel to the surface of the shoulder 11 against which the sealing element 20 bears.

The first portion 21 of the sealing element 20 faces the first portion 10a of the housing, and thus the front end of the tool 1. Hereby, the vacuum prevailing in the first portion 10a of the housing 10 may in the illustrated embodiment further aid the spring 30 in urging the sealing element 20 against the shoulder 11. Further, the sealing arrangement 100 rotates along with the axle 40. Therefore the seal against the axle 40 by the second portion 22 of the element 20 may be described as a static seal whereas the seal against the shoulder 11 at the first end 21 may be described as a dynamic seal. The sealing arrangement is however not fixed with respect to the axle in an axial direction, but may slide along the axle 40 at the second portion 22 constituting the area of contact between the sealing element 20 and the axle 40.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A handheld electric tightening tool comprising:
    a housing; and
    a sealing arrangement,
    wherein the sealing arrangement is adapted to seal a first portion of the housing from a second portion of the housing, and comprises a sealing element and a spring,
    wherein the sealing element comprises a first portion adapted to bear against a shoulder formed in the housing, and a second portion adapted to bear against a portion of an outer surface of a rotating axle of the tool, the first portion and the second portion being provided at different positions along an axial direction of the rotating axle,
    wherein the spring is adapted to, at a first end, bear against a shoulder formed in the sealing element and, at a second end, bear against a supporting element arranged on the rotating axle, such that a force is exerted on the sealing element urging the sealing element against the shoulder formed in the housing, wherein the sealing element comprises an intermediate portion arranged between the first portion and the second portion of the sealing element, and wherein the intermediate portion is a resilient portion such that the second portion of the sealing element is biased against the outer surface of the rotating axle.

2. The handheld electric tightening tool according to claim 1, wherein the sealing element is rotationally symmetric and encircles the rotating axle, such that the second portion of the sealing element is adapted to bear against a circumferential portion of the outer surface of the rotating axle.

3. The handheld electric tightening tool according to claim 1, wherein the supporting element arranged on the rotating axle is a radially protruding support element.

4. The handheld electric tightening tool according to claim 3, further comprising a washer arranged between the spring and the radially protruding support element.

5. The handheld electric tightening tool according to claim 3, wherein the radially protruding support element is an external circlip.

6. The handheld electric tightening tool according to claim 1, wherein the sealing arrangement rotates with the rotating axle.

7. The handheld electric tightening tool according to claim 1, wherein the first portion of the sealing element is arranged at a first end of the sealing element and the second portion of the sealing element is arranged at a second end of the sealing element.

8. The handheld electric tightening tool according to claim 7, wherein the first end of the sealing element is a distal end.

9. The handheld electric tightening tool according to claim 1, wherein the first portion of the sealing element extends in a plane, and wherein the rotating axle is normal to the plane.

10. The handheld electric tightening tool according to claim 1, wherein the second portion of the sealing element constitutes a single area of contact between the sealing element and the rotating axle.

11. The handheld electric tightening tool according to claim 1, wherein the sealing element is made from a low friction material.

12. The handheld electric tightening tool according to claim 1, wherein the sealing arrangement is adapted to provide an air tight seal, and wherein a first pressure prevailing in the first portion of the housing is lower than a second pressure prevailing in the second portion of the housing.

13. The handheld electric tightening tool according to claim 12, wherein a vacuum prevails in the first portion of the housing.

14. The handheld electric tightening tool according to claim 13, wherein the handheld electric tightening tool is adapted to be fitted with a vacuum adapter for picking up screws, wherein the first portion of the housing in which vacuum prevails is adapted to be fluidly connected to the vacuum adapter.

* * * * *